United States Patent [19]
Oldenburg et al.

[11] Patent Number: 6,027,695
[45] Date of Patent: Feb. 22, 2000

[54] APPARATUS FOR HOLDING SMALL VOLUMES OF LIQUIDS

[75] Inventors: Kevin R. Oldenburg, Chadds Ford, Pa.; Gregory F. Hollis; Thomas D. Y. Chung, both of Wilmington, Del.

[73] Assignee: DuPont Pharmaceuticals Company, Wilmington, Del.

[21] Appl. No.: 09/053,287

[22] Filed: Apr. 1, 1998

[51] Int. Cl.[7] ............................. B01L 3/00; G01N 21/64
[52] U.S. Cl. ................. 422/102; 435/288.4; 435/305.2; 436/172
[58] Field of Search ............ 422/61, 102; 436/172, 436/174, 809; 435/288.3, 288.4, 305.1, 305.2; 356/244

[56] References Cited

U.S. PATENT DOCUMENTS

| | | | |
|---|---|---|---|
| 4,545,958 | 10/1985 | Dopatka | 422/102 |
| 4,735,778 | 4/1988 | Maruyama et al. | 422/102 |
| 4,770,856 | 9/1988 | Uthemann et al. | 422/104 |
| 4,948,442 | 8/1990 | Manns | 156/73.1 |
| 4,956,150 | 9/1990 | Henry | 422/102 |
| 5,456,360 | 10/1995 | Griffin | 206/433 |
| 5,472,672 | 12/1995 | Brennan | 422/131 |

FOREIGN PATENT DOCUMENTS

| | | |
|---|---|---|
| 106662 | 4/1984 | European Pat. Off. . |
| 0542422 | 5/1993 | European Pat. Off. . |
| 4405375 | 8/1995 | Germany . |
| 4424112 | 1/1996 | Germany . |
| 19541980 | 4/1996 | Germany . |
| 4446698 | 6/1996 | Germany . |
| 61-215947 | 9/1986 | Japan . |
| 2296151 | 6/1990 | Japan . |
| 673964 | 4/1990 | Switzerland . |
| 2181843 | 4/1987 | United Kingdom . |
| 8703218 | 6/1987 | WIPO . |
| 9106368 | 5/1991 | WIPO . |
| 9413402 | 6/1994 | WIPO . |
| 9421379 | 9/1994 | WIPO . |
| 9428111 | 12/1994 | WIPO . |
| 9636436 | 11/1996 | WIPO . |
| 9828075 | 7/1998 | WIPO . |

OTHER PUBLICATIONS

ICN, Diagnostic Instrument & Reagents, 1992–1993 Catalog, pp. 1872–1873.

Reeves et al., "Investigation nof a Novel Microtiter Plate Support Material," Anal. Letters, 26(7), 1461–76 (1993).

Katagiri et al., "Enzyme Immunoassay for Peptide with New Microwell Plan," Chem. Express, 5(8), 617–20 (1990).

*Primary Examiner*—Jill Warden
*Assistant Examiner*—Dwayne K Handy
*Attorney, Agent, or Firm*—Blair Q. Ferguson

[57] ABSTRACT

An apparatus for holding liquid, such as a microtiter plate, in which a plurality of wells are formed. Each of the wells have side walls that intersect in an edge that defines the boundary between adjacent wells. The edge boundary prevents liquid from collecting between the wells, thereby causing all of the liquid applied to the plate to enter one of the wells. The microtiter plate can be formed from a material having a reflectance and/or fluorescence that is optimized for the particular application in which the microtiter plate will be used. Microtiter plates for use in fluorescence measurement applications are made from material having low fluorescence, such as a liquid crystal polymer, while microtiter plates for use in luminescence measurements are made from material having a high reflectance. Microtiter plates for spectrophotometric applications are made with wells having clear bottoms and opaque walls. Such clear bottomed wells can be made by incorporating a photobleachable dye into the plate material so as to render it essentially opaque and then irradiating the bottoms of the wells so as to render them transparent. Such wells can also be made by forming the plate from an essentially transparent material and then irradiating the sidewalls with a beam of light so as to render them essentially opaque.

25 Claims, 5 Drawing Sheets

APPARATUS FOR HOLDING SMALL VOLUMES OF LIQUIDS

FIELD OF THE INVENTION

The current invention is directed to an apparatus for holding small quantities of liquids, such as a microtiter plate.

BACKGROUND OF THE INVENTION

Traditionally, screening of agents for biological activity is accomplished by placing small amounts of the compound to be tested, either in liquid or solid form, in a number of wells formed in a microtiter plate. As used herein, the term "liquid" refers to pure liquids, as well as liquids containing particulate matter and solvents containing solute. The compound is then exposed to the target of interest, usually a purified protein such as an enzyme or receptor but also possibly a whole cell or non-biologically derived catalyst. The interaction of the test compound with the target is generally measured radiochemically, spectrophotometrically, or fluorometrically. For example, fluorescent probes have been developed which are substrates for enzymes or calcium indicators, pH indicators, amine-reactive or carboxylic acid-reactive, as discussed in the Handbook of Fluorescent Probes and Research Chemicals, 5th ed., R. Haugland and Karen Larison, editor, published by Molecular Probes, Inc., 1994.

Radiochemical measurement is usually considered the most sensitive of the detection methods, followed closely by fluorescence. However, the problems associated with using radioactive material, such as exposure limits, record keeping, and waste management, make this detection method significantly less attractive than detection by florescence. Consequently, the fluorescence measurement technique has gained wide spread acceptance.

In the fluorescence measurement technique, light of a given wave length is directed onto a sample within the well of a microtiter plate. A portion of this light is absorbed by the sample and reemitted at a different, typically longer, wave length, which is then measured. Instrumentation for fluorescence detection is based on conventional 96-well plates. Such instrumentation is available from Dynatech Laboratories, 14340 Sullyfield Circle, Chentilly, Va. 22021, and Packard Instrument Co., 800 Research Park, Meriden Conn. 06450.

The wells of conventional 96-well plates typically have volumes of approximately 400 microliters each. The wells typically have cylindrical walls and either flat, round, or V-shaped bottoms. The plates are conventionally made from a white or black plastic, such as polystrene, polypropelene, or ABS, that has relatively low intrinsic fluorescent properties. While this low level background fluorescence from the plate material is undesirable, it usually presents no major problems in fluorescence detection studies since the fluorescence from the sample in the well is generally orders of magnitude greater than the background fluorescence from the plate. This difference in fluorescence between the plate material and the sample is due both to the large volume of the sample in the well, usually 50–200 microliters, as well as the low surface area to volume ratio of the well in the plate.

The larger the quantity of wells that can be processed in a given batch, the higher the efficiency of the screening process. Consequently, it is desirable to concentrate a large number of wells in each microtiter plate by using microwells, rather than conventional wells. Such concentration of wells also permits very dense storage of collectives of discrete compounds for later testing as films in addressable grid positions, thus reducing the number of plates that must be tested in a complete collection of compounds.

The use of micro volumes in biological screening is also desirable for reasons other than increased throughput. First, reagents, both biologically and chemically derived, are generally expensive and in very limited supply. By decreasing the assay volume, many more test components can be assayed with a given amount of biological target. Second, combinatorial chemistry libraries are made by the sequential addition of small organic building blocks onto an organic scaffold. The scaffold is covalently linked to a solid support structure, such as a Tentagel resin, via an acid, base, or photo-cleavable linker. Such solid supports structures are commonly referred to as "beads" and encompass structures having a variety shapes and sizes. In general, each bead, which is approximately 130 microns in diameter, contains 100 to 200 picomoles of compound. The small amounts of compound found on a single bead requires that the assay of the compound on that bead be performed in small volume. For example, if all 100 picomoles of compound were cleaved from a single bead into the standard 200 microliter assay volume deposited in the 400 microliter well of a 96 well plate, the concentration would be 500 nanomolar, assuming a molecular weight of 500 daltons. This concentration is significantly below the ideal concentration of 10 micromolar that is generally used for screening compounds for biological activity. Also, it is generally desirable to be able to screen the compound at least twice so that the results can be confirmed if the compound tests active in the first assay. In order to reach the 10 micromolar concentration or to screen the compound at least twice, and have enough left over for determination by mass spectroscopy, the compound should be cleaved into less than 5 microliter.

Unfortunately, assay miniaturization creates a number of problems. Reducing the size of the wells increases the difficulty associated with accurately dispensing liquids into them because it becomes increasingly difficult to locate the dispensing device precisely over the center of each well. Inaccurate locating of the dispensing device will result in liquid being dispensed onto the boundary between wells, rather than into the wells themselves. Unfortunately, the wells of conventional microtiter plates are separated by flat, horizontal surfaces upon which liquid can collect if it is not accurately dispensed into the wells. The collection of liquid between wells can create a variety of problems, including partial filling of wells, loss of reagents, and inaccurate mixing and concentration of components. Although collection of liquid between wells can be minimized by the use of dispensing devices capable of highly accurate positioning (e.g., Packard Nanodrop™), such devices are very slow, rendering impractical kinetic assays that require near simultaneous dispensing of agents into each well. Consequently, the difficulty of accurately dispensing liquids into very small wells has limited the ability to incorporate large numbers of wells into a single microtiter plate.

Another problem associated with the use of small volume microwells is that pipetting into each well must be done sufficiently quickly so that evaporation does not significantly change the volume in the well. Conventional liquid handling devices, such as the Tomtech or Sagian, are capable of pipetting volumes as small as 1 microliter and placing the liquid at defined positions. However, it would take several tens of minutes to fill a microwell plate containing 2400 wells to 9600 wells using these devices, by which time the first filled wells would have experienced significant evaporation. Other liquid handling devices based on inkjet printer head technology, available from BioDot and Packard, are capable of pipetting nanoliter volumes but likewise require significant time to pipet directly into a small microwell.

Another problem associated with the use of small microwells arises in connection with fluorescence detection. The use of very small assay volumes results in significantly reduced reemitted light signals, making the technique extremely sensitive to signal detection errors. For example, a microwell having a volume of 0.5 microliters will produce a signal that is only 0.1 to 0.2% of the signal resulting from the use of the well of a conventional 96-well plate. Accurate measurement of fluorescence is also complicated by the intrinsic fluorescence, in at least one region of the spectrum that is useful for detection of biological reactions, of the plastics from which microtiter plates have conventionally been made, as previously discussed. The effect of such background fluorescence is exacerbated in small volume microwells because the well surface area to volume ratio is significantly greater than in conventional 96-well plates. Consequently, while a given level of background fluorescence might be tolerated in a 96-well plate design, it could potentially be larger than the total signal if the well size was reduced to that of a small microwell.

In addition to the problem of background fluorescence associated with the materials from which conventional microtiter plates are made, the geometry of such plates also creates problems in signal detection. In fluorescence measurement techniques, the detection of the reemitted light from the sample within microtiter plate wells is generally done with a charged coupled device (CCD) camera. This technique requires that the surface of the plate be as flat as possible so that the entire surface is in the same focal plane of the camera lens. If a plate were not flat, the wells across the plate would not be in the same focal plane and, consequently, light detection from the wells would not be uniform. This would, in turn, result in errors in determining the relative activity of the assay components in each well. Although conventional microtiter plates feature wells having a variety of bottoms (e.g., flat, V-shaped, round), the well walls of conventionally 96-well microtiter plates are cylindrical. When imaged with a CCD camera, such a cylindrical well act as a lens, which tends to focus the reemitted light from the sample into the center of the well resulting in a gradient in the signal across the well. The signal gradient across the well results in signal deterioration and, hence, causes error in determining the relative activity in wells across the plate.

Although, as discussed above, fluorescence measurements benefit from plate materials having minimum intrinsic fluorescence, different screening technique benefit from the optimization of other properties of the microtiter plate material. Such optimization is important when using small microwells. In spectrophotometric techniques, light of a given wave length is directed onto the sample and the amount of light that passes through the sample is detected. Consequently, in this application, it is desirable for the microtiter plate wells to be as transparent as possible so as to minimize the interference with the transmitted light. Luminescence measurements are also used to perform biological assays. In this technique, the light generated by the sample is detected. Since the amount of light generated is relatively small, it is desirable that the microtiter plate material provide as high a reflectance as possible so as to maximize the signal.

Consequently, it would be desirable to provide an apparatus for holding liquids that allowed increased throughput screening by incorporating a large number of small wells but in which liquid was prevented from collecting at the boundaries between adjacent wells. It would also be desirable to provide an apparatus for holding liquids having optimal properties for the particular screening application.

SUMMARY OF THE INVENTION

It is an object of the current invention to provide an apparatus for holding liquid in wells that incorporated a large number of small wells but in which liquid is prevented from collecting at the boundaries between adjacent wells. This and other objects is accomplished in an apparatus comprising a plate in which a plurality of adjacent microwells are formed, each of the microwells having (i) a bottom, (ii) at least one side wall, and (iii) an opening for receiving a liquid. The walls of each two adjacent microwells intersect so as to form an upward facing edge, the edge defining the boundary between the openings of the adjacent microwells. In a preferred embodiment of the invention, the width of each edge is no greater than approximately 250 microns, the radius of curvature is no greater than approximately 150 microns, and the maximum width of any horizontal surfaces formed on the edges is less than approximately 80 microns, and the plate is formed from a liquid crystal polymer.

The invention also encompasses a method of screening an agent for biological activity comprising the steps of (i) suspending a plurality of beads in a solvent so as to form a bead containing suspension, (ii) pouring the suspension onto a plate having a plurality of microwells, each of which has a bottom, at least one side wall, with side walls of adjacent microwells intersecting so as to form an upward facing edge, and an opening for receiving the suspension, with openings of adjacent microwells separated by a boundary defined by the edge, whereby a portion of the solvent enters each of the microwells, (iii) allowing the suspended beads to settle into the microwells so that at least one of the beads is suspended in the portion of the solvent in each of the microwells, (iv) removing the solvent, and (v) applying the agent onto the plate.

It is another object of the invention to prove a microtiter plate having improved imagining capability. Consequently, another embodiment of the invention comprises a microtiter plate in which each of the side walls of the wells has a first portion that forms an opening for receiving liquid and that is inclined at an angle to the vertical direction, and a second portion that extends essentially in the vertical direction.

It is also an object of the invention to provide a method for making microtiter plates, especially microtiter plates for use in spectrophotometric assays. Consequently, one embodiment of the invention encompasses a method of making microtiter plates comprising the steps of (i) incorporating a photobleachable dye into a material so as to render the material essentially opaque, (ii) forming the essentially opaque material into a microtiter plate having a plurality of wells formed therein, each of the wells having a bottom formed from a portion of the essentially opaque material, and (iii) irradiating the bottoms of the wells so as to render the material forming the bottoms transparent.

In another embodiment, the method of making microtiter plates comprises the steps of (i) forming a plate having a plurality of wells from an essentially transparent material, each of the wells having a bottom and a sidewall, and (ii) irradiating the sidewalls with a beam of light so as to render the sidewalls essentially opaque.

DESCRIPTION OF THE PREFERRED EMBODIMENT

Figure 1:
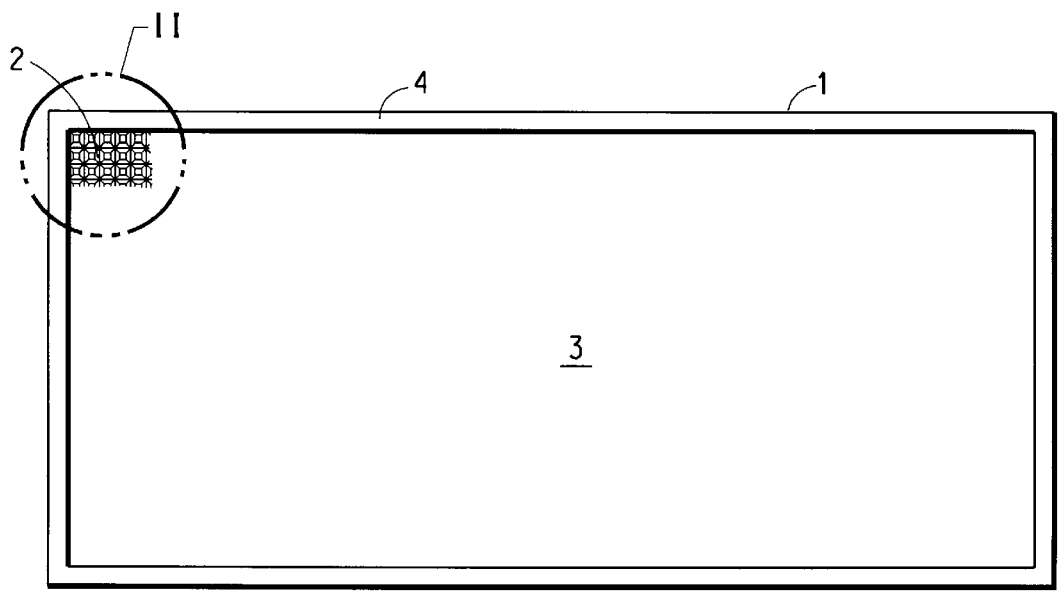
FIG. 1 is plan view of a microtiter plate according to the current invention.

A microtiter plate 1 according to the current invention is shown in FIG. 1. As is conventional, the microtiter plate 1 is preferably rectangular, being. approximately 125 mm long, 85 mm wide, and 4 mm thick. Use of these dimensions allows the plate to be handled and indexed by currently available devices for automated microtiter plate handling. However, unlike conventional microtiter plates, the microtiter plate 1 according to the current invention may contain a very large number of very small microwells 2. Preferably, each of the microwells 2 has a depth of approximately 1 mm and a volume of approximately 0.5 microliters or less. In one embodiment of the invention, 9600 microwells, each having a volume of approximately 0.4 microliters, are arranged in 120 rows and 80 columns. Each of the microwells 2 has an inlet 6 that forms an approximately 1 mm square. However, a lesser number of larger microwells, for example 2400 microwells, each having a depth of approximately 3 mm and a volume of approximately 5 microliters, arranged in 60 rows and 40 columns, may also be preferred. In this embodiment, each microwell has an inlet that forms an approximately 2 mm square. Although a rectangular microtiter plate 1 is shown, it should be understood that the microtiter plate according to the current invention could be fashioned in other shapes as well, for example a circular plate having a 125 mm diameter containing 14,500 wells arranged in a honeycomb pattern could be constructed. Such a circular arrangement will maximize the use of a circular imagining field.

Figure 2:
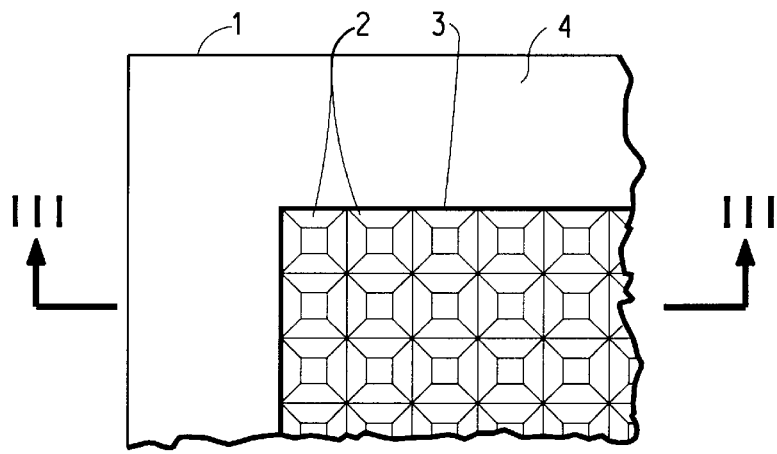
FIG. 2 is a detailed view of the portion of FIG. 1 enclosed by the circle indicated by II.
Figure 3:
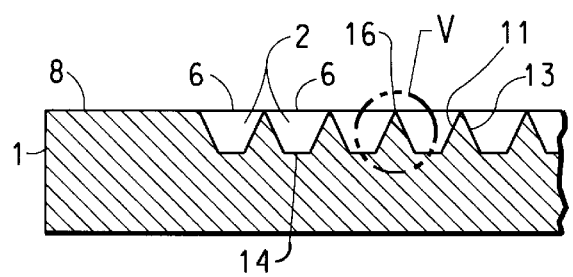
FIG. 3 is a cross section taken through line III—III shown in FIG. 2.
Figure 4:
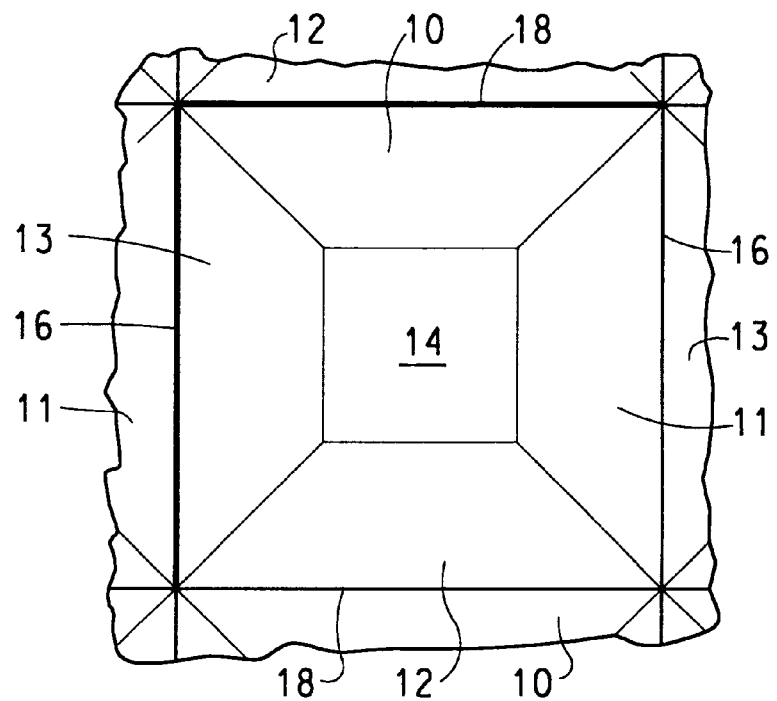
FIG. 4 is a detailed plan view of one of the microwells shown in FIG. 2.

As shown in FIG. 1, the microtiter plate 1 has a border 4 that surrounds a working portion 3 of the plate. As shown in FIGS. 2–4, the working portion 3 of the plate 1 consists of microwells 2 having square inlets 6 formed on the upper surface 6 of the plate. In the preferred embodiment of the invention, the body of each microwell 2 is formed by four walls, each of which extends downward from the inlet 6. The four walls consist of a first pair of opposing walls 10 and 12 and a second pair of opposing walls 11 and 13. According to one important aspect of the invention, the walls 10–13 are inclined at an angle A to the vertical direction—that is, an angle with respect to a line perpendicular to the plane of the plate—as shown best in FIG. 5. Thus, the microwells 2 have the shape of an inverted four sided pyramid. Preferably, the walls 10–13 are steep, so that the angle A is no greater than approximately 45°. Most preferably, the angle A is approximately 30° or less. As a result of the inclined walls 10–13, essentially all of the light incident upon the wells that is not absorbed by the plate material is either reflected away from the lens of the CCD camera or other detection device, or reflected to the opposite side of the well, thereby preventing the aforementioned lens effect.

As shown in FIG. 3, the bottoms 14 of the microwells 2 are preferably flat. However, other shape bottoms, such as arcuate or conical bottoms, could also be utilized.

According to an important aspect of the invention, the walls 11 and 13 of adjacent microwells 2 intersect along edges 16, as shown best in FIGS. 3 and 4. Similarly, the walls 10 and 12 of adjacent microwells 2 intersect along edges 18. The edges 16 and 18 form the inlets 6 of the microwells 2. Thus, the boundary between the inlets 6 of adjacent microwells 2 is formed entirely by edges 16 and 18 so as to a void the formation of flat, horizontal surfaces that would allow liquid to collect between microwells.

Although in the embodiment shown in FIGS. 1–4, the microwells have the shape of four side pyramids, other shapes could also be utilized provided that the boundary between the inlet of adjacent microwells is formed by an edge without any intervening flat, horizontal surfaces that would allow liquid to collect.

Figure 7A:
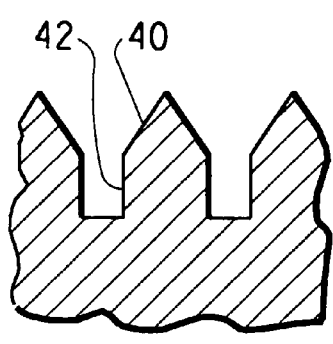
FIGS. 7(a) and (b) are cross sectional views showing two alternate embodiments of the microwells according to the current invention.
Figure 7B:
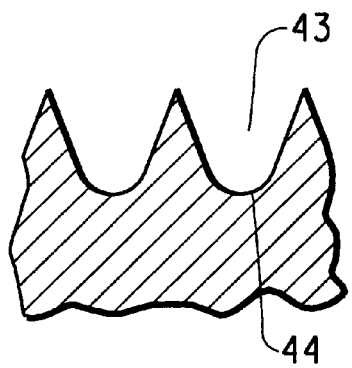

As shown in FIG. 7(a), microwells could be formed with walls having a first portion 40, adjacent the inlet edge, that is inclined or conical, and a second portion 42, adjacent the well bottom, that is vertical or cylindrical. By increasing the depth of the vertical portion of the walls, the depth of the microwell 40 and, therefore, its volume, can be increased without increasing the size of its inlet. Thus, this geometry allows increasing the volume of the microwells without reducing their density. Although the walls in FIGS. 3 and 7 are shown as being straight, arcuate walls, having either convex or concave curvature, could also be utilized, provided that they formed sufficiently sharp edges, as discussed below. As shown in FIG. 7(b), microwells 43 with arcuate bottoms 44 could also be formed.

Figure 8:
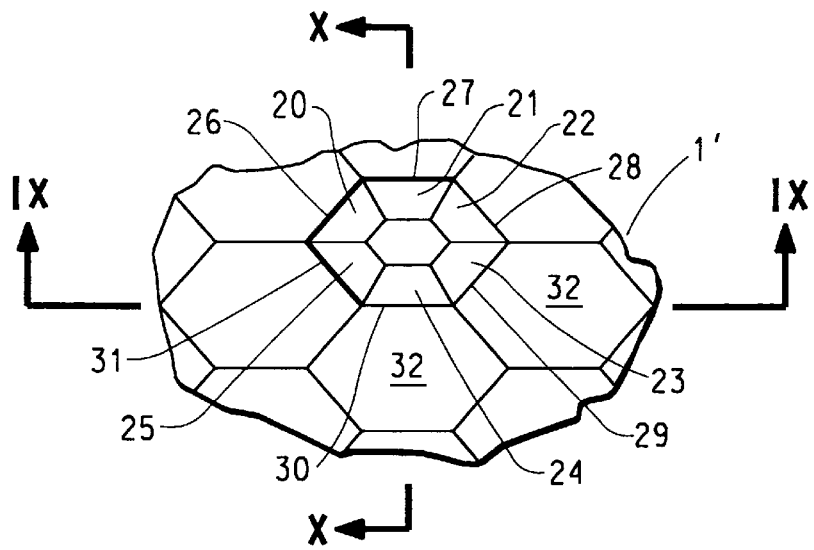
FIG. 8 is a plan view of an alternate arrangement of microwells according to the current invention. In order to avoid confusion due to unnecessary complexity of the drawing, the bottom is shown in only one of the microwells shown in FIG. 8.
Figure 9:
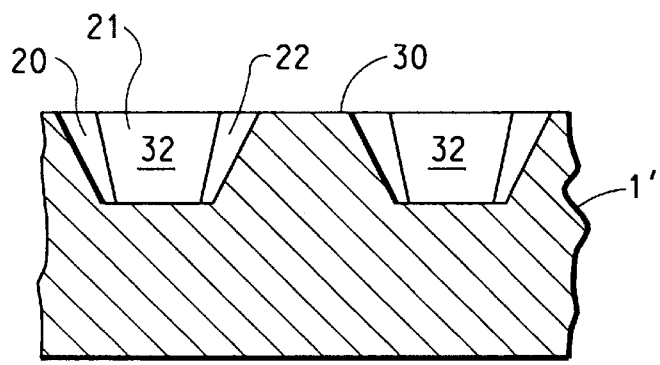
FIG. 9 is a cross section taken along line IX—IX shown in FIG. 8.
Figure 10:
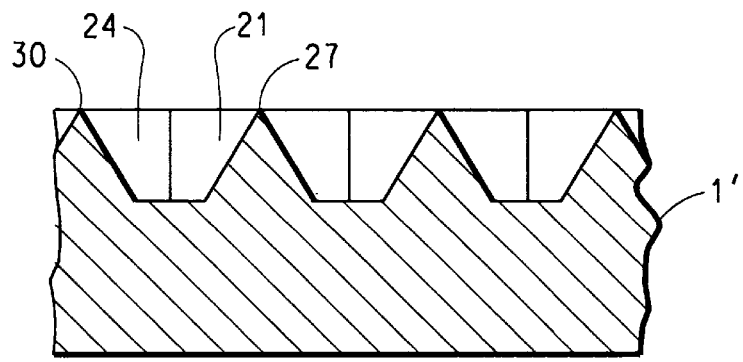
FIG. 10 is a cross section taken along line X—X shown in FIG. 8.

FIGS. 8–10 show an alternate embodiment in which the microtiter plate 1' has hexagonal microwells 32 arranged in a honeycomb configuration. In this embodiment, the microwells 32 have six inclined walls 20–25 that intersect with the walls of the adjacent microwells along edges 25–30.

Figure 11:
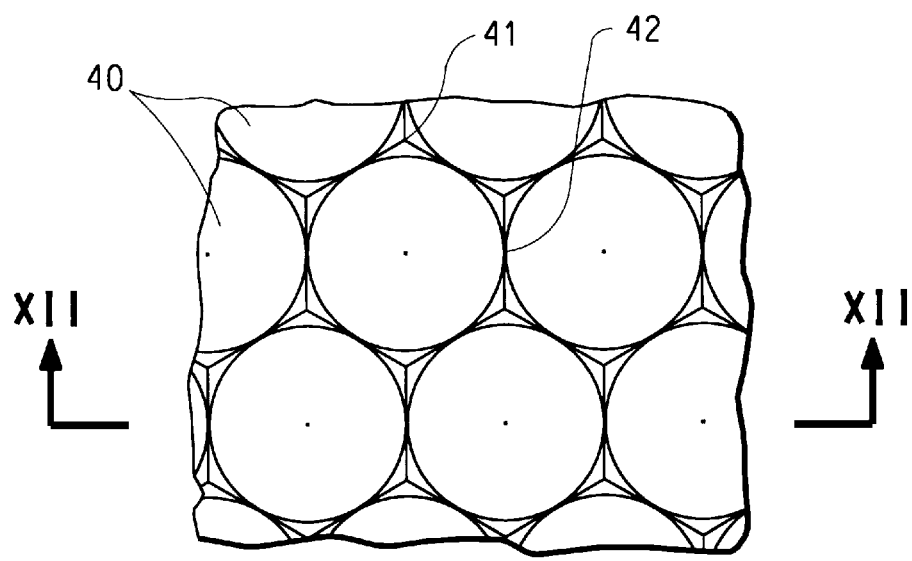
FIG. 11 is a plan view of another alternate arrangement of microwells according to the current invention.
Figure 12:
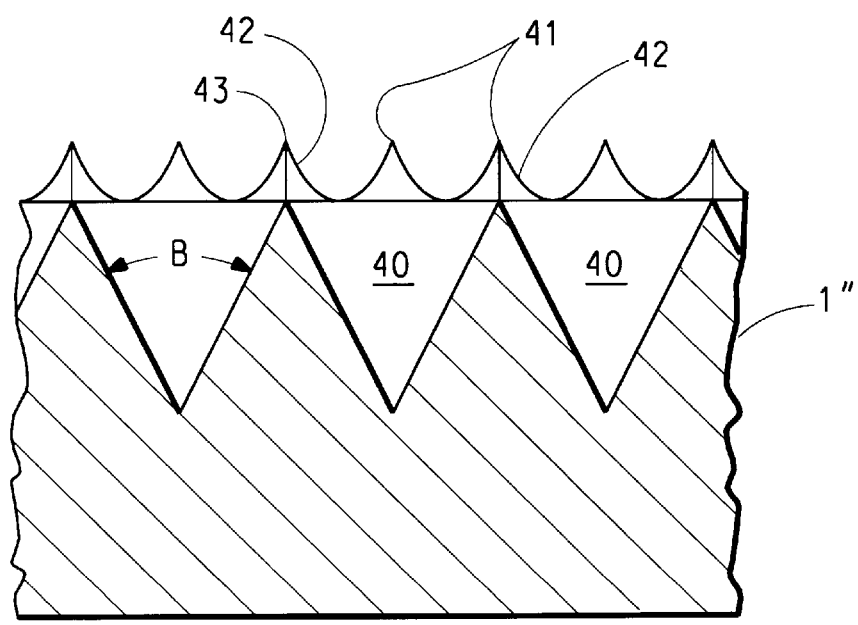
FIG. 12 is a cross section taken along line XII—XII shown in FIG. 11.

FIGS. 11 and 12 show yet another embodiment in which conical microwells 40 are utilized. In this embodiment, the inlets of the microwells are circles and the bottoms come to a point. However, flat or arcuate bottoms, as previously discussed, could also be utilized. The included angle B of the cone is preferably no greater than approximately 90°, and, more preferably, no greater than approximately 60°. In order to ensure that liquid cannot collect between adjacent microwells 40, three faceted projections 43 are formed between each three adjacent microwells, with each facet facing one of the microwells. The projections 43 form points that are connected by edges 42, thereby ensuring that liquid cannot collect between microwells 40.

Figure 5:
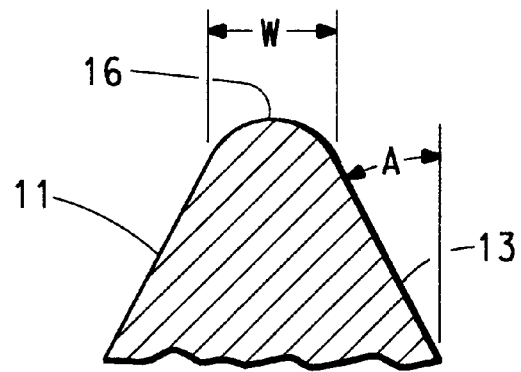
FIG. 5 is a detailed view of the portion of FIG. 3 enclosed by the circle indicated by V, showing an enlargement of the boundary between microwells.
Figure 6:
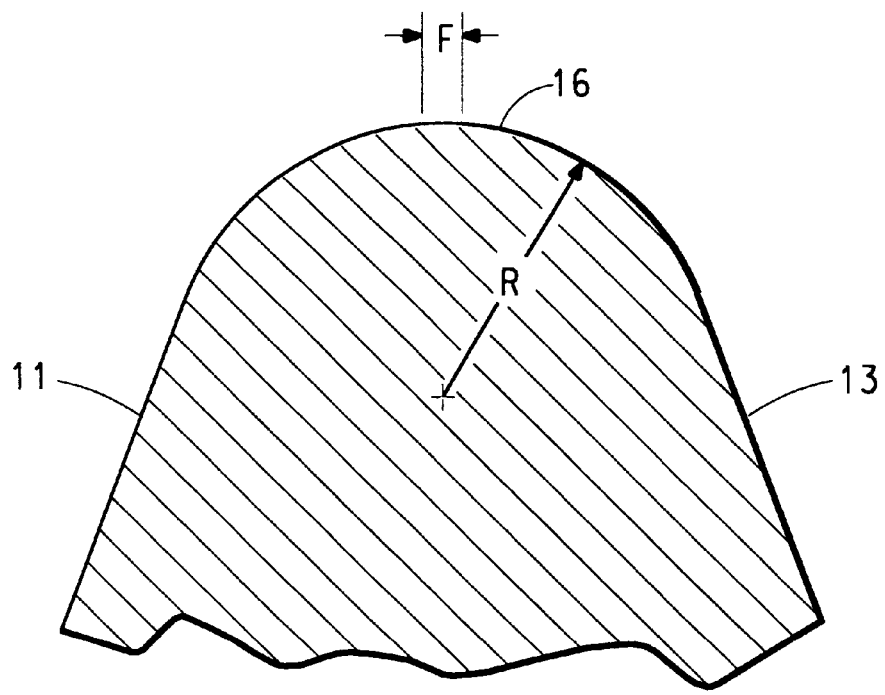
FIG. 6 is a view showing a further enlargement of the microwell boundary shown in FIG. 5.

Although it is preferable to form the edges between adjacent microwells, such as edges 16 and 18 in the embodiment shown in FIGS. 1–4, in as sharp a manner as possible, it must be realized that it is impossible to form a perfect edge in any material. This is especially so with respect to the plastics from which the microtiter plates 1 according to the current invention are preferably formed, as discussed further below. With reference to the embodiment shown in FIGS. 1–4, for example, when enlarged with sufficient magnification, the edges 16 and 18 will typically appear rounded, as shown in FIGS. 5 and 6, rather than perfectly sharp. Nevertheless, collection of liquid on the edges 16 and 18 can be prevented by ensuring that the edges have either a width or a radius of curvature, or both, that are sufficiently small. Preferably, the edges 16 and 18 have a width W (that is, the width of the rounded portion connecting the walls 11 and 13 and 10 and 12) no greater than approximately 250 microns and a radius of curvature R no greater than approximately 150 microns.

Moreover, although it is preferable to avoid the formation of any flat, horizontal surfaces, it must be realized that upon sufficient magnification, minimal flat, horizontal surfaces may be visible on the edges 16 and 18, as shown in FIG. 6, without impairing the functioning of the microtiter plate according to the principles of the current invention. Consequently, the width F of any flat, horizontal surfaces on the edges 16 and 18 should preferably be less than approximately 80 microns.

Microwells constructed according to the current invention ensure that all of the liquid deposited on the working portion 3 will find its way into one of the microwells since there are no flat surfaces between microwells that would allow liquid to collect and the edges 16 and 18 and the walls 10–13 tend to divert any liquid dispensed between microwells toward the well cavity. Thus, extremely accurate positioning of a dispensing orifice to dead center of the microwells is unnecessary, thereby permitting the use of a large number of very small microwells 2. When using microwells according to the current invention, the wells can be filled with liquid much the same way that paint is applied to a wall with a sprayer. Liquid hitting the surface of the plate must go into a well and will not accumulate on the interwell surface.

The use of the microtiter plate according to the current invention will now be discussed in connection with a combinatorial chemistry application. First, a library of approximately 20,000 beads, each of which may be only approximately 130 microns in size, is suspended in absolute ethanol and sonicated briefly to make a suspension. This suspension is then poured onto the surface of a plate having 9600 microwells formed according to the current invention. Note that accurate, or even discrete, dispensing of the suspension into the wells is unnecessary and, in fact, the suspension can be poured over the plate in a continuous fashion.

After the application of the suspension to the plate, the beads, which are randomly distributed over the working surface of the plate, are then allowed to settle. When a bead comes in contact with the surface of the plate, the geometry of the well inlets ensures that each of the beads rolls into one of the wells. Consequently, if 20,000 beads are applied to the surface of the plate, each well will contain on average two beads as defined by a Poisson distribution. The ethanol is then removed via evaporation and a small amount of compound is cleaved from the beads. The target, usually an enzyme or protein receptor, to be tested is then applied to the surface of the plate using the inkjet printer head technology described above.

Microtiter plates according to the current invention are preferably formed by injection molding a plastic. Suitable injection molders include Atlantis Industries, Inc., Federal and Park, Milton, Del. In this regard, any one of a large number of plastics, such a polypropolyene, nylon, or polystyrene could be utilized. While such plastics are suitable for radiochemical or spectrophotometric assays, their intrinsic fluorescence causes problems in fluorescence detection, as previously discussed. According to one embodiment of the current invention, this problem is solved by forming the microtiter plate 1 from a liquid crystal polymer, which has essentially no fluorescence with respect to wave lengths in the 300 nm to 650 nm range, which is the range of interest for most biological screening applications. As used herein, the term "essentially no fluorescence" refers to materials whose fluorescence cannot be detected using a CCD camera. Preferably pigments are added to the liquid crystal polymer so as to obtain an opaque black material, thereby minimizing reflectance. The use of an intrinsically non-fluorescent and non-reflective liquid crystal polymer minimizes interference from the microtiter plate material in fluorescent measurement applications. In addition, liquid crystal polymers mold uniformly and are very chemically resistant. Suitable liquid crystal polymers include, but are not limited to, glass reinforced and mineral filled polymers, such as those available from Hoechst Celanese, including, but not limited to grades A115, A130, A150, A230, A410, A420, A422, A430, A435, A440, A515, A530, A540, A625, A700, B230, C115, C130, C150, C550, C810, E130i, K130, K140, L130, V140, and 8130. Most preferably, the liquid crystal polymer is grade A530D.

According to another embodiment of the current invention, the microtiter plate is formed from a highly reflective material, such as white polystyrene, polycarbonate, or acrylic, so as to enhance the performance of the microtiter plate when used for measurement of luminescence. In this embodiment, sufficient reflectance is obtained by adding pigments, such as zinc or tungsten oxide, to the material forming the microtiter plate so as to yield, for example, a white opaque material. Alternatively, the walls and bottoms of the microwells could be coated with a reflective film by vapor deposition of metal particles, direct spraying, or lamination under vacuum of mirrored Mylar™ film.

Spectrophotometric assays require that the bottom of the well be optically clear. Consequently, in still another embodiment, suitable for use in such assays, the bottoms of the microwells are transparent, while the walls are nonreflective, as previously discussed. This embodiment may be formed by incorporating a photobleachable dye into a liquid crystal polymer, thereby resulting in material having an opacity greater than approximately 2 absorbance units (1% transmittance), and preferably greater than approximately 3 absorbance units (0.1% transmittance). Suitable photobleachable dyes include methyl violgens, paraquat, and nitrophenol based dyes, which are added in sufficient quantity to achieve the specified opacity singly or in combination. After injection molding, the microwell bottoms are irradiated with a fine, intense laser light of proper wave length, preferably of several millivolts in a 0.5 mm width, thereby bleaching the material that forms the bottoms of the wells so as to result in transparent bottoms of preferably less than approximately 0.01 absorbance units (99.95% transmittance) and, more preferably, less than approximately 0.001 absorbance units (99.99% transmittance). Such bottoms facilitate the transmission of light through the microwell, while the dye in the material forming the walls of the wells prevents the piping of light within the plate material between adjacent wells, thereby avoiding undesirable "cross-talk." Consequently, the accuracy of spectrophotometric measurements is enhanced.

Alternatively, this embodiment could be formed by injection molding the microtiter plate from a clear material, such as polystrene or a liquid crystal polymer, and then bonding a photochromic film, such as DuPont Dyluxl™, onto the side walls of the microwells using heat lamination (shrink wrap), chemisorption, or an adhesive. Yet another alternative is to mold the microtiter plate from a clear material, such as polycarbonate, polystrene, or acrylic, that has been doped with photochromic dyes or films but then render the walls of the wells opaque by application of high intensity light to only the walls, for example by irradiating the wall material with near ultraviolet light from 300–400 nm for several minutes to hours, as necessary to achieve the desired opacity. This could be accomplished by the use of positionally accurate laser beams or by first masking the bottoms of the wells and using standard photoresists and optical masking techniques well known in the semiconductor industry.

The present invention may be embodied in other specific forms without departing from the spirit or essential attributes thereof and, accordingly, reference should be made to the appended claims, rather than to the foregoing specification, as indicating the scope of the invention.

What is claimed:

1. An apparatus for holding a liquid during assay, comprising a plate in which a plurality of adjacent wells are formed, each of said wells having (i) a bottom, (ii) at least one side wall, said side walls of adjacent wells intersecting so as to form an upward facing edge, and (iii) an opening for receiving a liquid, said openings of adjacent wells being separated by a boundary defined by said edge.

2. The apparatus according to claim 1, wherein the width of each of said edges is no greater than approximately 250 microns.

3. The apparatus according to claim 2, wherein each of said edges forms an arcuate surface having a radius of curvature no greater than approximately 150 microns.

4. The apparatus according to claim 1, wherein the maximum width of any horizontal surface formed on said edges is less than approximately 80 microns.

5. The apparatus according to claim 1, wherein a first portion of each of said side walls is disposed adjacent said upward facing edge, and wherein said first side wall portions are inclined at an angle with respect to the vertical direction.

6. The apparatus according to claim 5, wherein a second portion of each of said side walls extends in essentially the vertical direction.

7. The apparatus according to claim 5, wherein each of said first portions of said well side walls forms a conical surface.

8. The apparatus according to claim 7, wherein each of said side walls further comprises a second portion, said second side wall portions being cylindrical.

9. The apparatus according to claim 7, wherein said conical surface forms an included angle of no greater than approximately 90°.

10. The apparatus according to claim 9, wherein said included angle is no greater than approximately 60°.

11. The apparatus according to claim 5, wherein said first side wall portions of each of said wells forms an angle of no greater than approximately 45° with respect to the vertical direction.

12. The apparatus according to claim 11, wherein said angle said first side wall portions form with respect to the vertical direction is no greater than 30°.

13. The apparatus according to claim 1, wherein each of said wells is a microwell.

14. The apparatus according to claim 13, wherein the volume of each of said microwells is no greater than approximately 5 microliters.

15. The apparatus according to claim 14, wherein the volume of each of said microwells is no greater than approximately 0.5 microliters.

16. The apparatus according to claim 1, wherein at least approximately 2400 microwells are formed in said plate.

17. The apparatus according to claim 16, wherein at least approximately 9600 microwells are formed in said plate.

18. The apparatus according to claim 1, wherein said plate is formed from a liquid crystal polymer.

19. The apparatus according to claim 1, wherein each of said well bottoms is flat.

20. The apparatus according to claim 1, wherein each of said well bottoms is arcuate.

21. The apparatus according to claim 1, wherein said plate is formed from a transparent material, and further comprising a photochromic film bonded to said side walls.

22. An apparatus according to claim 1, wherein said plate is formed from a material having essentially no fluorescence in the range of wave lengths in the 300 nm to 650 nm range.

23. The apparatus according to claim 22, wherein said material is a liquid crystal polymer.

24. A method of screening an agent for biological activity, comprising the steps of:
    a) suspending a plurality of beads in a solvent so as to form a bead containing suspension;
    b) pouring said suspension onto a plate having a plurality of microwells formed therein, each of said microwells having (i) a bottom, (ii) at least one side wall, said side walls of adjacent microwells intersecting so as to form an upward facing edge, and (iii) an opening for receiving said suspension, said openings of adjacent microwells being separated by a boundary defined by said edge, whereby a portion of said solvent enters each of said microwells;
    c) allowing said suspended beads to settle into said microwells so that each of said beads is suspended in said portion of said solvent in one of said microwells;
    d) removing said solvent; and
    e) applying said agent onto said plate.

25. The method according to claim 23, wherein said beads are from a combinatorial chemistry library.

* * * * *